Sept. 25, 1956 W. E. BRADLEY 2,764,676

GYROMAGNETIC INTEGRATOR CIRCUIT

Filed Sept. 13, 1952 2 Sheets-Sheet 1

INVENTOR.
WILLIAM E. BRADLEY
BY
Brown, Denk & Synnestvedt
AGENTS

INVENTOR.
WILLIAM E. BRADLEY
BY
Brown, Denk & Synnestvedt
AGENTS

United States Patent Office 2,764,676

Patented Sept. 25, 1956

2,764,676

GYROMAGNETIC INTEGRATOR CIRCUIT

William E. Bradley, New Hope, Pa., assignor to Philco Corporation, Philadelphia, Pa., a corporation of Pennsylvania Application September 13, 1952, Serial No. 309,481

13 Claims. (Cl. 250—27)

This invention relates to integrator circuits for separating periodic signals from aperiodic signals and more particularly to integrator circuits which make use of the gyromagnetic properties of atomic nuclei to effect the separation.

In certain forms of signal integrators or separators now in current use, separation of periodic signals from contaminating aperiodic signals is achieved by passing the combined signal through a time delay network or a specially designed filter which has a delay time or frequency response characteristic related in some way to the periodicity of the signal to be separated. The sweep integrator is a well known example of the time delay method of signal separation. In the sweep integrator the combined signal, which may contain periodic pulses plus random noise, is introduced into a loop having a gain slightly less than unity and a delay time exactly equal to the repetition period of the pulse signals. The pulse signals circulating in the loop will combine with later applied pulse signals in a fixed phase with a resultant reinforcement or increase in amplitude of these signals within the loop. Random noise and other signals not having a period equal to the delay time of the loop will combine in a random phase with later applied signals with no resultant reinforcement in amplitude. The reinforced periodic signal may be separated from the unreinforced aperiodic signal by means of an amplitude discriminator. Sweep integrators suffer from the disadvantage that the gain of the recirculating loop must be controlled within very precise limits for, if the gain exceeds unity, oscillations will occur that will mask the desired signal. If the gain is permitted to decrease to a value substantially less than unity the necessary enhancement of the periodic signal is not achieved. Sweep integrators suffer from the further disadvantage that they are essentially fixed frequency devices, the frequency of the signal enhanced or reinforced being controlled by the relatively inflexible delay time of the recirculating loop. These and other limitations of the sweep integrator have been partially overcome but only by resort to extreme complexity in circuit design.

Periodic signals may be separated from aperiodic signals by passing the combined signal through a plurality of tuned elements in parallel, each tuned element having a narrow passband centered on a harmonic of the periodic signal. This combination of individual filters is known in the art as a comb filter because of the similarity in appearance between the frequency response characteristic of the combination and the teeth on a comb. Again, the comb filter is essentially a fixed frequency device and has many other disadvantages that make it unsuitable for general application in the electronic arts.

It is known that because atomic nuclei have a gyroscopic moment and a magnetic moment resulting from the nuclear spin, they can be made to resonate at any frequency within a relatively wide frequency band by the application of an external magnetic field of appropriate strength. It can be shown that coupling between two perpendicularly oriented coils surrounding a common volume can be accomplished by causing the atomic nuclei within the common volume to resonate at the frequency of the signals applied to one of the coils. Flux-meters that use the phenomenon of nuclear resonance have been developed and are now commercially available. However, it is believed that the application of the features described above to the field of signal integration was unknown prior to conception of the present invention.

Therefore it is an object of the present invention to provide a new and improved signal integrator system.

It is a further object of the invention to provide a signal integrator system that does not depend on conventional tuned elements or time delay devices.

It is a further object of the present invention to provide a signal integrator system that is tunable in frequency over a relatively wide band of frequencies.

Still another object of the invention is to provide a signal integrator system that avoids the complexity of prior art devices.

These and other objects of the present invention are accomplished by supplying the signal to be integrated to two identical, double coil nuclear inductors at different amplitude levels. The level of the input signal at one inductor is sufficient to cause the inductor to saturate in response to periodic signals but insufficient to cause saturation in response to aperiodic signals. The input level at the second resonator is made sufficiently low so that no saturation occurs for either periodic or aperiodic signals. The output signal from the first nuclear inductor is amplitude divided by the ratio of the two input signals and subtracted from the output signal of the second nuclear inductor. The subtraction process results in complete cancellation of aperiodic signals without a corresponding cancellation of periodic signals.

For a better understanding of the invention, together with other and further objects thereof, reference should be made to the following detailed description which is to be read in conjunction with the accompanying drawings, in which.

Figure 1:
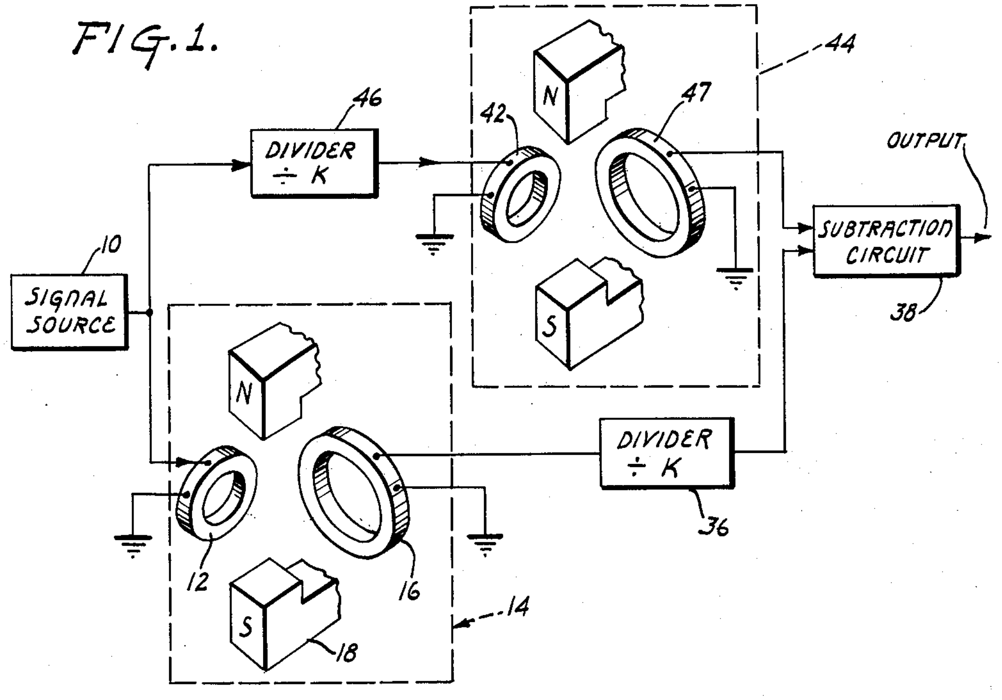
Fig. 1 is a block diagram of a preferred embodiment of the invention.

In Fig. 1 block 10 represents the source of a desired periodic signal which may or may not be obscured by random or aperiodic signals generated within source 10 or resulting from some external condition. Signal source 10 may be a radar receiver in which the periodic signals are derived from target reflected echoes and the aperiodic signals result from random clutter signals returned from irregular surfaces surrounding the target. The invention is not limited to this type of signal source but will operate satisfactorily with many other signal sources having both periodic and aperiodic signals in the output. The periodic signal may be a single frequency signal or a complex signal composed of harmonically related component frequencies.

The signal from source 10 is applied to the input coil 12 of a first nuclear inductor 14. In the illustration of nuclear inductor 14 in Fig. 1 certain of the parts of the inductor have been omitted and other parts have been displaced from their true position in order to show the electrical connections between the inductor and the external circuits. Therefore reference should be made to Figs. 2, 3 and 4 for a more complete illustration of inductor 14.

Figures 2, 3:
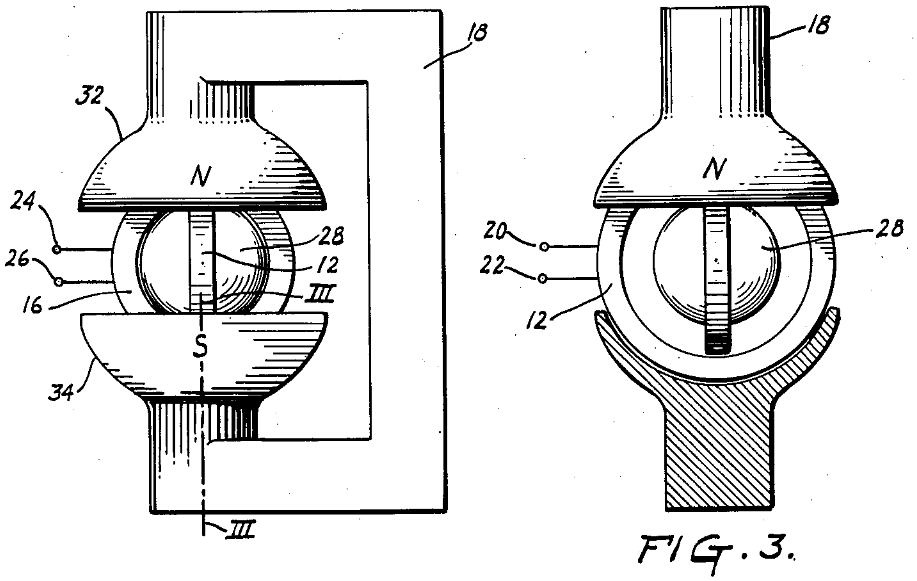
Fig. 2 is a schematic view of a nuclear inductor that forms a part of the present invention.
Fig. 3 is a second view of the inductor of Fig. 2 taken in a plane at right angles to the plane of Fig. 2, the lower pole piece of Fig. 3 being broken away along the line III—III of Fig. 2.
Figure 4:
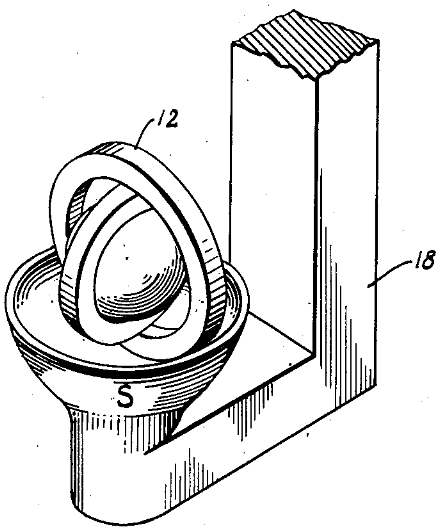
Fig. 4 is a perspective view of the inductor of Figs. 2 and 3 with the upper pole piece broken away.

As shown in Figs. 2, 3 and 4, input coil 12 and output coil 16 are disposed in mutually perpendicular planes within the region bounded by the north and south pole pieces of a magnet 18. Coils 12 and 16 have a common axis which is coincident with the axes of the pole pieces of magnet 18. Coil 12 is formed of several circular loops of a single conductor, each loop being disposed in the plane of the coil. The ends of the conductor are brought out at 20 and 22 to provide input terminals to which the signal from source 10 may be applied. Coil 16 is similarly formed of several conductive turns disposed in a plane normal to the plane of coil 12. The ends of the conductor forming coil 16 are brought out to terminals 24 and 26. Coil 16 is formed with an inner diameter substantially equal to the outer diameter of coil 12 so that the two coils together define a substantially spherical common volume. Disposed within this common volume is a non-magnetic container 28 which is filled with a material that will supply the atomic nuclei essential to the operation of the inductor. By way of specific example, container 28 may be a glass container filled with distilled water which supplies hydrogen nuclei or protons. The inductor will operate with a wide variety of atomic nuclei, but hydrogen nuclei are preferred because they have the highest ratio of magnetic moment to gyroscopic moment of any of the elements.

Magnet 18 has north and south pole pieces 32 and 34 so shaped as to provide a magnetic field directed parallel to the common diameter of coils 12 and 16 and extending throughout the volume enclosed by container 28. The intensity of this magnetic field is preferably of the order of several kilogauss. Figs. 2, 3 and 4 are not intended as design drawings of the nuclear resonator 14 and no design data is included herein since the design of magnetic pole pieces to give a particular distribution of magnetic field is a highly developed and widely practiced art and for the further reason that nuclear inductors of the type described have been made commercially available in the form of sensitive fluxmeters and have thus become familiar to the designers in the art to which this invention relates.

Referring once again to Fig. 1, the coil 16 is coupled through an amplitude divider circuit 36 to one input of subtraction circuit 38. Amplitude divider circuit 36 may be a tapped resistor, a step down transformer or other suitable amplitude dividing circuit which will reduce the amplitude of the signals passing therethrough by some constant factor K, where K may have some value such as 2 or 10 depending upon the design of the circuit. Alternatively, divider 36 may be an amplifier having a gain lower than the gain of a correspondingly positioned amplifier in a second channel about to be described. Subtraction circuit 38 may consist of an inverter stage followed by a linear, passive adding network or any one of a number of well known types of subtraction circuits.

The signal applied to coil 12 is also applied to the input coil 42 of a second nuclear inductor 44 through a second amplitude divider 46. Inductor 44 is preferably identical to the inductor 14 described above. Amplitude divider 46 may be identical to amplitude divider 36 except that any gain measured from source 10 to the input coil 42 must be less than the gain from source 10 to coil 12. Therefore divider 46 is preferably of the type having a gain less than unity. Amplitude dividers 36 and 46 divide the signals passing therethrough in exactly the same ratio. This ratio is indicated in Fig. 1 by the letter K. Therefore if divider 36 is or includes an amplifier, an amplifier (not shown) must be included between the nuclear inductor 44 and subtraction circuit 38 in order that the net gain of this amplifier (not shown) and divider 46 will be equal to the net gain of divider 36. Output coil 47 of nuclear resonator 44 is connected to a second input of subtraction circuit 38. As suggested above, subtraction circuit 38 is a linear subtraction device which produces an output signal proportional in amplitude to the instantaneous difference in amplitude of the two input signals.

In order that the operation of the invention may be fully understood, the operation of the nuclear inductor 14 shown in Figs. 2, 3 and 4 will first be explained in detail. Coupling between coils 12 and 16 is through the process of nuclear induction. The phenomenon of nuclear induction results from the interaction of the nuclear spin and the nuclear magnetic moment of the hydrogen nuclei within container 28 with the external magnetic field provided by magnet 18. Each nucleus possesses a spin and also possesses a magnetic moment and a gyroscopic moment resulting from this spin. Since the magnitude of the spins of nuclei of a particular species are always the same, the magnetic moments and likewise the gyroscopic moments for nuclei of a particular species are all the same. The gyroscopic moment possessed by each nucleus is similar to that of a top or gyroscope, and the magnetic poles which give rise to the magnetic moment provide a means by which a force couple may be applied to the spinning nucleus. The application of this force couple to a spinning nucleus causes the spin axis to precess, swinging around the surface of a cone. The rate of this precession for any species of nucleus is directly related to the strength of the applied magnetic field. Normally the axes of the spinning nuclei point in all possible directions and under these conditions the external effects of their precession on coil 16, for example, exactly cancel. This cancellation may be understood by assuming that each precessing, spinning nucleus induces a minute signal in coil 16 but that the phases of these minute signals are randomly distributed so that the net signal received by coil 16 is zero. The application of a periodic signal at the precession frequency to coil 12 produces an alternating magnetic field which will increase the precession of certain nuclei and decrease the precession of other nuclei depending upon the relative phase between the precessing nuclei and the applied alternating magnetic field. The alternating magnetic field produces a coherence in phase in the precessing nuclei so that there is a net coupling of energy from the precessing nuclei to coil 16. If a strong periodic signal is applied to coil 12 the output signal of coil 16 will build up as the precessing nuclei are forced to precess in phase.

It can be shown that the ability of the nuclei to couple energy from coil 12 to coil 16 is linear for signal amplitudes below a critical value but for amplitudes above this critical value a saturation effect is encountered which reduces the amount of energy coupled from coil 12 to coil 16. This saturation phenomenon is not susceptible to simple explanation but is well recognized by those familiar with nuclear induction. It is best explained by stating that, with a constant and above critical amplitude periodic signal applied to the input coil of a nuclear inductor, the output signal will gradually decrease in amplitude with time until it finally reaches zero amplitude. Upon removal of the input signal, the ability of the atomic nuclei to couple a signal from the input coil to the output coil is gradually restored.

For a uniform magnetic field, the range of frequencies that will be coupled from coil 12 to coil 16 is limited to a bandwidth of 3 or 4 cycles even though the center of the band may be of the order of 30 to 60 megacycles. Therefore the inductor 14 acts as an extremely narrow band-pass filter. The bandwidth of a nuclear inductor can be increased by causing the magnetic field to vary in strength over the volume enclosed by container 28. If this is done, the magnetic forces applied to the spinning nuclei in one region of container 28 will be greater than the magnetic forces applied to the nuclei in other regions within container 28. The difference in applied magnetic forces will result in a corresponding difference in the precession frequencies in these regions. The shape of the frequency response curve of a nuclear inductor will depend upon the volume of water permeated by each different strength of magnetic field. The cutoff characteristics of the filter may be maintained extremely sharp by controlling the distribution of the magnetic field. In the present invention the bandwidth is preferably made sufficiently wide to pass several harmonics of the periodic signal. The variation in magnetic field required can be kept at a minimum by modulating the periodic signal on a high frequency carrier. If source 10 represents a radar system the modulated signal can be obtained directly from the intermediate frequency amplifier of the system.

Referring once again to Fig. 1, the signal from source 10 is coupled from coil 12 to coil 16 through the process of nuclear induction. Aperiodic signals do not cause saturation of inductor 14. However, periodic signals, within the band of frequencies to which inductor 14 is tuned by the external magnetic field, produce an output signal in coil 16 which gradually decays in amplitude when saturation takes place. This saturation in response to periodic signals without a corresponding saturation in response to aperiodic signals is possible for the reason that the periodic signal is characterized by a line spectrum corresponding to relatively large concentrations of energy at discrete frequencies, whereas the aperiodic signal is characterized by a relatively uniform distribution of energy over the entire band to which the nuclear inductor is tuned. It is to be understood that saturation takes place only at the discrete frequencies of the periodic signal and not uniformly over the passband of the nuclear inductor. The signal applied from source 10 to divider 46 is reduced in amplitude to a level such that neither the periodic nor the aperiodic signal produces saturation in inductor 44. Therefore the output of inductor 44 appearing at coil 47 contains all periodic signals within the band of frequencies to which inductor 44 is tuned and frequency components of the aperiodic signal lying within this frequency band. The divider 36 is provided to assure that the components of the aperiodic signals obtained from coil 16 are exactly equal in amplitude to the components of the aperiodic signals appearing in the output of coil 47. These components of equal amplitude are applied to subtraction circuit 38 where they are subtracted one from the other. The net signal obtained from this subtraction is zero. The periodic signals appearing in the output of coil 47 are larger in amplitude than the periodic signals appearing in the output of divider 36 as a result of the saturation which took place in inductor 14. Therefore the subtraction of the signal from divider 36 from the signal obtained from coil 47 will leave a net signal which appears at the output of subtraction circuit 38. This signal from subtraction circuit 38 is the desired periodic signal entirely separated from the contaminating aperiodic signals and may be applied directly to an indicator or a control devcie.

Figure 5:
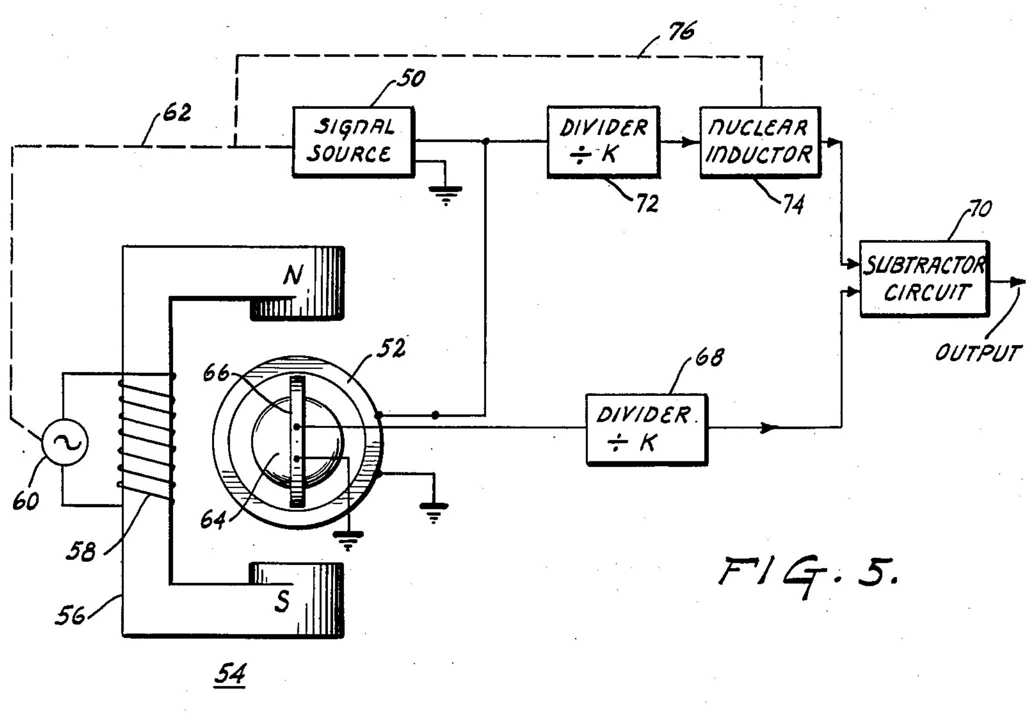
Fig. 5 is a block diagram of an embodiment of the invention for integrating certain special types of aperiodic signals.

In certain instances it may be desirable to integrate several quasi-periodic signals which, while not having a fixed frequency, vary only slightly from a fixed frequency and in a predetermined manner. Fig. 5 illustrates a system for integrating such quasi-periodic signals. The source of quasi-periodic signals is shown at 50. The signal to be integrated is supplied to input coil 52 of nuclear inductor 54. Nuclear inductor 54 is provided with a magnet 56 which may be substantially identical in design to magnet 18 of Figs. 2, 3 and 4. In the embodiment shown in Fig. 5 means are provided for varying the field strength of magnet 56 in a manner to cause the resonant frequency of inductor 54 to be held at the instantaneous frequency of the quasi-periodic signal of source 50. In Fig. 5 the means for altering the intensity of the magnetic field are conventionally illustrated by coil 58 wound on magnet 56, and a generator 60 which supplies electrical energy thereto. The signal supplied by generator 60 is controlled by the frequency of the signal from source 50 as conventionally illustrated by the broken line 62 connecting source 50 to generator 60. Means for so controlling the output of generator 60 are well known in the art and therefore will not be described in detail. Inductor 54 includes a container 64 and an output coil 66 which correspond to container 28 and output coil 16 of Figs 2, 3 and 4. The signal from ouput coil 66 is applied through an amplitude divider 68 to one input of the subtraction circuit 70. Again divider 68 and subtraction circuit 70 may be identical in construction to divider 36 and subtraction circuit 38 of Fig. 1. A signal from source 50 is applied through a second amplitude divider 72 which has the same division ratio as divider 68. The output of divider 72 is coupled to a second nuclear inductor 74 which is preferably identical in every respect to inductor 54. The tuning of inductor 74 is also controlled by the signal from source 50 as evidenced by the broken line 76. The output of inductor 74 is connected to the second input to subtraction circuit 70. The operation of the system shown in Fig. 5 is very similar to the operation of the circuit shown in Fig. 1, the only difference being that the resonant frequencies of inductors 54 and 74 are continuously varied to compensate for the variation in frequency of the quasi-periodic signal produced by source 50.

The time required for saturation, and the critical amplitude level at which saturation takes place in the inductors described above, can be varied to some extent by varying the materials enclosed by the coils of the inductor. The nature of the molecule within which the hydrogen atom is located determines to a certain extent the rate at which saturation occurs. An increase in the saturation time represents a corresponding increase in the number of periods of the signal that are integrated. The operating frequency of the system may be varied by varying the intensity of the field supplied by magnets of the nuclear inductors. This change in magnetic field intensity may be readily accomplished if magnet 18 and corresponding magnets in the other nuclear inductors shown are constructed as electromagnets. Electrostatic shielding may be provided between the input and output coils to insure that no direct coupling takes place between these two coils.

Other changes and modifications may be made in the embodiments shown without departing from the spirit and scope of the invention. Therefore, the full scope of the invention is to be determined by reference to the hereinafter appended claims.

What is claimed is:

1. A signal integrator circuit for separating periodic signals from aperiodic signals, said signal integrator circuit comprising two substantially identical nuclear inductors, two substantially identical signal dividers and a subtraction circuit, one of said nuclear inductors and one of said signal dividers being arranged in a first signal channel coupling the source of signals to be integrated to said subtraction circuit, said nuclear inductor preceding said signal divider in said first signal channel, the other said nuclear inductor and the other said signal divider being arranged in a second signal channel coupling said source of signals to be integrated to said subtraction circuit, said signal divider preceding said nuclear inductor in said second signal channel, said subtraction circuit being constructed and arranged to provide an output signal proportional to the difference in amplitude of the signals coupled thereto from said first and second signal channels respectively.

2. A signal integrator circuit for separating periodic signals from aperiodic signals, said signal integrator circuit comprising two substantially identical nuclear inductors, each of said nuclear inductors being constructed and arranged to pass at least one harmonic, including the first, of said periodic signal, two substantially identical signal dividers, and a subtraction circuit, one of said nuclear inductors and one of said signal dividers being arranged in a first signal channel coupling the source of signals to be integrated to said subtraction circuit, said nuclear inductor preceding said signal divider in said first signal channel, the other said nuclear inductor and the other said signal divider being arranged in a second signal channel coupling said source of signals to be integrated to said subtraction circuit, said signal divider preceding said nuclear inductor in said second signal channel, said subtraction circuit being constructed and arranged to provide an output signal proportional to the difference in amplitude of the signals coupled thereto from said first and second signal channels respectively.

3. A signal integrator circuit for separating periodic signals from aperiodic signals, said signal integrator circuit comprising two substantially identical nuclear inductors, each of said nuclear inductors including an input coil and an output coil, said nuclear inductors being constructed and arranged to pass at least one harmonic, including the first, of said periodic signal, two signal dividers having substantially identical division ratios, and a subtraction circuit, a first one of said nuclear inductors and a first one of said signal dividers being arranged in a first signal channel coupling the source of signals to be integrated to said subtraction circuit, said input coil and said output coil of said first nuclear inductor being coupled to said source and said first signal dividers respectively, the division ratio of said first signal divider being sufficient to reduce the amplitude of said periodic signal below the level that will cause saturation of said first nuclear inductor, the other nuclear inductor and the other signal divider being arranged in a second signal channel coupling said source to said subtraction circuit, said input and said output coils of said other nuclear inductor being coupled to said other signal divider and said subtraction circuit respectively.

4. A signal integrator circuit for separating periodic signals from aperiodic signals, said signal integrator comprising two substantially identical nuclear inductors, each of said nuclear inductors including an input coil and an output coil arranged in mutually perpendicular planes intersecting along a common axis of said two coils, said input and output coils defining a common volume, and a magnet, said magnet being constructed and arranged to produce a magnetic field directed parallel to said common axis, the distribution of said field throughout said common volume being such that said nuclear inductor is arranged to pass a plurality of harmonics including the first of said periodic signal, two signal dividers having substantially identical division ratios, and a subtraction circuit, a first one of said nuclear inductors and a first one of said signal dividers being arranged in a first signal channel coupling the source of signals to be integrated to said subtraction circuit, said input coil and said output coil of said first nuclear inductor being coupled to said source and to said first signal divider respectively, the division ratio of said first signal divider being sufficient to reduce the amplitude of said periodic signal below the level that will cause saturation of said first nuclear inductor, the other nuclear inductor and the other signal divider being arranged in a second signal channel coupling said source to said subtraction circuit, said input and said output coils of said other nuclear inductor being coupled to said other signal divider and said subtraction circuit, respectively, said subtraction circuit being constructed and arranged to provide an output signal proportional to the difference in amplitude of the signals coupled thereto from said first and second signal channels respectively.

5. A signal integrator circuit for separating periodic and quasi-periodic signals from random signals, said signal integrator circuit comprising two substantially indentical nuclear inductors, each of said nuclear inductors including an input coil and an output coil arranged in mutually perpendicular planes intersecting along a common axis of said two coils, said input and output coils defining a common volume, and a magnet, said magnet being constructed and arranged to produce a magnetic field directed parallel to said common axis, means associated with the source of said quasi-periodic signals and said two nuclear inductors for controlling the intensities of said magnetic fields in accordance with the instantaneous frequency of said quasi-periodic signal, two substantially identical signal dividers, and a subtraction circuit, a first one of said nuclear inductors and a first one of said signal dividers being arranged in a first signal channel coupling the said source of signals to be integrated to said subtraction circuit, said input coil and said output coil of said first nuclear inductor being coupled to said source and to said first signal divider respectively, the division ratio of said first signal divider being sufficient to reduce the amplitude of said periodic and quasi-periodic signals below the level that will cause saturation of said first nuclear inductor, the other nuclear inductor and the other signal divider being arranged in a second signal channel coupling said source to said subtraction circuit, said input and said output coils of said other nuclear inductor being coupled to said other signal divider and said subtraction circuit respectively.

6. A signal integrator circuit for separating desired electrical signals from random signals comprising a subtraction circuit, first and second signal channels adapted to be coupled to a source of said random and desired signals and to said subtraction circuit, said first and second channels being arranged to receive equal signals from said source, each of said channels including a nuclear inductor, the nuclear inductors included in said two channels having substantially identical signal transfer characteristics, each of said nuclear inductors including an input coil and an output coil arranged in mutually perpendicular planes intersecting along a common axis of said two coils, said input and output coils defining a common volume, a water filled container disposed within said common volume, a magnet, said magnet being constructed and arranged to produce a magnetic field directed substantially parallel to said common axis, the distribution of said field throughout said common volume being such that said nuclear inductor is arranged to pass a plurality of harmonics of said desired signal, means included in said first signal channel at a point preceding said nuclear inductor for reducing the amplitude of the signal applied to said nuclear inductor to a level such that said nuclear inductor in said first channel does not saturate in response to said desired signal, said second channel including means for equalizing the gain of said two channels, said subtraction circuit being constructed and arranged to provide an output signal proportional in amplitude to the difference in the amplitudes of signals coupled thereto from said first and second channels respectively.

7. A signal integrator circuit for separating quasi-periodic electrical signals from random signals, said signal integrator circuit comprising a subtraction circuit, first and second signal channels for coupling a source of said random and quasi-periodic signals to said subtraction circuit, said first and second signal channels being arranged to receive equal input signals from said source, each of said channels including a nuclear inductor, said two nuclear inductors having substantially identical signal transfer characteristics, each of said nuclear inductors including an input coil and an output coil arranged in mutually perpendicular planes intersecting along a common axis of said two coils, said input and output coils defining a substantially spherical common volume, a water filled container disposed within said common volume, a magnet, said magnet being constructed and arranged to produce a magnetic field directed parallel to said common axis, and means associated with said source and said two nuclear inductors for controlling the intensities of said magnetic fields in accordance with the instantaneous frequency of said quasi-periodic signal, the distribution of said magnetic fields throughout said common volumes being such that said nuclear inductors are arranged to pass a plurality of harmonics of said quasi-periodic signal, means included in said first signal channel at a point preceding said nuclear inductor for reducing the amplitude of the signal applied thereto to a level such that said nuclear inductor in said first channel does not saturate in response to said quasi-periodic signal, said second circuit including means for equalizing the gain of said two channels, said subtraction circuit being constructed and arranged to provide an output signal proportional in amplitude to the difference in the amplitudes of signals coupled thereto from said first and second channels respectively.

8. A signal integrator circuit for separating periodic electrical signals from random signals, said signal integrator circuit comprising a subtraction circuit, first and second signal channels for coupling a source of said periodic and random signals to said subtraction circuit, said two channels being arranged to receive substantially equal signals from said source, one of said channels including means constructed and arranged to saturate progressively in response to the continued application of periodic signals exceeding a certain amplitude, said two channels being arranged to have substantially equal gain for signals not causing saturation, said subtraction circuit being constructed and arranged to provide an output signal proportional to the difference in amplitude of the signals coupled thereto from said first and second signal channels respectively.

9. A signal integrator circuit for separating periodic signals from aperiodic signals, said signal integrator circuit comprising two substantially identical nuclear inductors, two signal ratio circuits having substantially identical ratios between the amplitude of the input signal supplied thereto and the amplitude of the output signal supplied thereby, and a subtraction circuit, one of said nuclear inductors and one of said ratio circuits being arranged in a first signal channel coupling the source of signals to be integrated to said subtraction circuit, said nuclear inductor preceding said ratio circuit in said first signal channel, the other said nuclear inductor and the other said ratio circuit being arranged in a second signal channel coupling said source of signals to be integrated to said subtraction circuit, said ratio circuit preceding said nuclean inductor in said second signal channel, and said subtraction circuit being constructed and arranged to provide an output signal proportional to the difference in amplitude of the signals coupled thereto from said first and second signal channels respectively.

10. A signal integrator circuit for separating periodic signals from aperiodic signals, said signal integrator comprising two substantially identical nuclear inductors, two signal ratio circuits having substantially identical ratios between the amplitude of the input signal supplied thereto and the amplitude of the output signal supplied thereby, and a subtraction circuit, each of said nuclear inductors including an input coil, an output coil and a magnet, said input and output coils being arranged in mutually perpendicular planes intersecting along a common axis of said two coils, said input and output coils defining a common volume, and said magnet being constructed and arranged to produce a magnetic field directed parallel to said common axis, the distribution of said field throughout said common volume being such that said nuclear inductor is arranged to pass a plurality of harmonics, including the first, of said periodic signals, a first one of said nuclear inductors and a first one of said ratio circuits being arranged in a first signal channel coupling the source of signals to be integrated to said subtraction circuit, said input coil and said output coil of said first nuclear inductor being coupled to said source and said first ratio circuit respectively, the other nuclear inductor and the other signal divider being arranged in a second signal channel coupling said source to said subtraction circuit, said input and said output coils of said other nuclear inductor being coupled to said other ratio circuit and said subtraction circuit respectively, the ratio between the input and output amplitude of said ratio circuits being such that the periodic signals supplied to one nuclear inductor are at a level sufficient to cause saturation therein and such that periodic signals supplied to the other nuclear inductor are below the level which will cause saturation therein, and said subtraction circuit being constructed and arranged to provide an output signal proportional to the difference in amplitude of signals supplied thereto from said first and second signal channels respectively.

11. A signal integrator circuit for separating desired electrical signals from random signals comprising first and second signal channels adapted to be coupled to the source of said random and desired signals so as to be equally energized thereby, and a subtraction circuit having first and second inputs connected to the outputs of said first and second signal channels respectively, said subtraction circuit being constructed and arranged to provide an output signal proportional in amplitude to the difference in amplitudes of signals supplied thereto from said first and second channels, each of said channels including a nuclear inductor, the nuclear inductors included in said two channels having substantially identical signal transfer characteristics, means included in said first signal channel at a point preceding said nuclear inductor for causing the amplitude of the signal supplied to the nuclear inductor in said first channel to differ from the amplitude of the signal supplied to the nuclear inductor of the second channel by a preselected factor, the smaller of said two last-mentioned signals having an amplitude such that the nuclear inductor to which it is supplied does not saturate in response to said desired signal, and means included in one of said channels for equalizing the gain of said two channels.

12. A signal integrator circuit for separating desired electrical signals from random signals comprising first and second signal channels adapted to be coupled to the source of said random and desired signals so as to be equally energized thereby, and a subtraction circuit having first and second inputs connected to the outputs of said first and second signal channels respectively, said subtraction circuit being constructed and arranged to provide an output signal proportional in amplitude to the difference in amplitudes of signals supplied thereto from said first and second channels, said first channel including a nuclear inductor and means disposed at a point preceding said nuclear inductor for causing the amplitude of the signal supplied to said nuclear inductor to be at a level such that said nuclear inductor saturates in response to said desired signal, said second channel including means having a signal transfer characteristics substantially identical to said nuclear inductor and means disposed at a point preceding said last-mentioned means for causing the amplitude of the signal supplied thereto to be below the level which will cause saturation therein, and one of said channels including means for equalizing the gain of said two channels.

13. A signal integrator circuit for separating desired electrical signals from random signals, comprising first and second signal channels adapted to be coupled to the source of said random and desired signals so as to be equally energized thereby, and a subtraction circuit having first and second inputs connected to the outputs of said first and second signal channels respectively, said subtraction circuit being constructed and arranged to provide an output signal proportional in amplitude to the difference in amplitude of signals supplied thereto from said first and second channels, said first channel including, intermediate its input terminals and its output terminals, a nuclear inductor, said nuclear inductor having an input coil and an output coil arranged in mutually perpendicular planes intersecting along an axis of said two coils, said input and output coils defining a common volume, means providing a concentrated source of atomic nuclei in said common volume, and a magnet constructed and arranged to produce a magnetic field directed parallel to said common axis, said first channel further including means connecting the input of said first channel to said input coil of said nuclear inductor, said last-mentioned means being arranged to cause the amplitude of the signals supplied to said input coil to be at a level such that said nuclear inductor saturates in response to said desired signal, said second channel including means intermediate its input terminals and its output terminals having a signal transfer characteristic substantially identical to the unsaturated characteristic of said nuclear inductor, and one of said channels including means for equalizing the gain of said two channels for signals which do not saturate said nuclear inductor.

References Cited in the file of this patent

UNITED STATES PATENTS

| | | |
|---|---|---|
| 2,580,148 | Wirkler | Dec. 25, 1951 |
| 2,679,588 | Henry | May 25, 1954 |